United States Patent [19]

Efron et al.

[11] Patent Number: 4,679,910

[45] Date of Patent: Jul. 14, 1987

[54] DUAL LIQUID-CRYSTAL CELL-BASED VISIBLE-TO-INFRARED DYNAMIC IMAGE CONVERTER

[75] Inventors: Uzi Efron, Los Angeles; Bernard H. Soffer, Pacific Palisades, both of Calif.

[73] Assignee: Hughes Aircraft Company, Los Angeles, Calif.

[21] Appl. No.: 714,145

[22] Filed: Mar. 20, 1985

[51] Int. Cl.[4] .............................................. G02F 1/135
[52] U.S. Cl. .................................. 350/335; 350/350 R
[58] Field of Search ................... 350/350 R, 335, 354, 350/350 E; 357/24; 250/213 R

[56] References Cited

U.S. PATENT DOCUMENTS

| | | | |
|---|---|---|---|
| 3,694,053 | 9/1972 | Kahn | 350/350 R |
| 3,824,002 | 7/1974 | Beard | 350/350 R |
| 3,976,361 | 8/1976 | Fraas et al. | 350/350 R |
| 4,019,807 | 4/1977 | Boswell et al. | 350/350 R |
| 4,114,991 | 9/1978 | Bleha, Jr. | 350/350 R |
| 4,239,348 | 12/1980 | Grinberg et al. | 350/350 R |
| 4,346,250 | 8/1981 | Wada et al. | 350/335 |
| 4,378,955 | 4/1983 | Bleha, Jr. | 350/350 R |
| 4,443,064 | 4/1984 | Grinberg et al. | 350/350 R |

OTHER PUBLICATIONS

"Electric-Field-Induced Orientational Deformation of Nematic Liquid Crystals: Tunable Birefringence", by Fredrick J. Kahn, Applied Physics Letters, vol. 20, No. 5, 1 Mar. 1972, pp. 199-201.
"The Liquid Crystal-Based Visible to IR Dynamic Image Converter", by U. Efron et al., SPIE Proceedings, Paper 465-22, Jan. 22-27, 1984.

Primary Examiner—Arthur G. Evans
Attorney, Agent, or Firm—V. D. Duraiswamy; V. G. Laslo; A. W. Karambelas

[57] ABSTRACT

A visible to infrared dynamic image converter light valve includes two liquid crystal layers disposed on opposite sides of a photoconductive substrate. The two liquid crystal layers spatially modulate an incident infrared beam by polarization rotation. A voltage is applied across the two liquid crystal layers, with the layers being responsive to the applied voltage, to vary the polarization rotation. The photoconductive layer receives and absorbs a visible wavelength image and spatially modulates the voltage across the two liquid crystal layers responsively to image intensity spatially to vary the polarization rotation. A mirror reflects the incident infrared beam back through the first and second layers such that the beam passes through the liquid crystal layers twice and is polarization rotated in proportion to the visible wavelength image. A wire grid polarizer converts the polarization rotation of the infrared beam to output intensity modulation to produce an infrared image.

22 Claims, 2 Drawing Figures

DUAL LIQUID-CRYSTAL CELL-BASED VISIBLE-TO-INFRARED DYNAMIC IMAGE CONVERTER

BACKGROUND OF THE INVENTION

The present invention relates generally to light valves and more particularly to the use of liquid crystal light valves for converting visible wavelength images to infrared wavelength images.

In the development of infrared imagers or "seekers" for advanced search and tracking systems, it is important to be able to test the infrared imagers with the same complex, dynamic scenes as they will encounter under actual field conditions. It is also important to be able to do so non-destructively to minimize cost and time factors. Therefore, computerized simulation systems are used for non-destructive infrared imager testing. Various field tests can be simulated and projected to the infrared imager for performing parametric testing in the laboratory. The advantages of such simulation systems are that they facilitate mission variation, accurately reproduce test environments, and increase proficiency in implementing improvements.

Computerized simulation systems generate an infrared coded visible wavelength image on a cathode ray tube (CRT) and convert it to a high-power infrared image which is projected onto an infrared imager under test. Both the CRT and the infrared imager are coupled to a computer which generates the visible images and monitors infrared images "seen" by the infrared imager. The heart of the simulator is an image converter which takes the infrared coded visible images on the CRT and converts them to the infrared images sensed by the infrared imager.

Ideally, a simulation system should be capable of providing a complex, fast-changing infrared scene with a high degree of dynamic range and resolution, and likewise be capable of real-time interaction with the computerized image generation system. Existing simulation systems have difficulty in meeting these criteria, primarily because of the prior IR conversion devices which have been used.

These prior devices typically utilize thermally produced radiation from thin-film materials for image conversion. Operation of such devices consists of illuminating the film with a high intensity visible beam containing scenery information from a CRT (or movie projector). The film heats up locally in response to the image intensity of the input visible beam and then emits an infrared wavelength pattern that is related to the spatial information presented by the high intensity visible input beam. With such devices, thermal images are projected directly onto the infrared imagers, and the input visible source is directly coupled to the output infrared image, both of which are disadvantageous.

In addition, the thin film infrared simulation systems suffer from low resolution caused by thermal spread in the image plane; slow thermal response caused by large thermal time constants; and limited dynamic range due to the conflict between higher resolution and the dynamic range of a thermal based simulation system.

Liquid crystal-based "light valves" or spatial light modulators have been proposed for use as infrared image converters due to their ability to modulate an infrared beam by polarization-rotation. An example of such a device is set forth in U.S. Pat. No. 4,114,991, issued to W. T. Bleha on Sept. 19, 1978. The development of, and theory underlying, light valve technology is illustrated in such patents as U.S. Pat. No. 3,824,002, issued to T. D. Beard on July 16, 1974 and U.S. Pat. No. 4,019,807, issued to D. D. Boswell, et al. on Apr. 26, 1977. The basic design of alternatingcurrent (AC) light valves is shown in the Beard patent. The configuration and operation of the light valve in the hybrid field effect mode, which accomplished the polarization-rotation necessary to effect spatial modulation of an infrared beam is discussed in the Boswell Patent, as well as in U.S. Pat. No. 4,378,955, issued to W. T. Bleha on Apr. 5, 1983. All of these patents are owned by the assignee of the present invention.

Two primary problems exist with employing existing light valves in the infrared wavelength spectral region which relate to the electro-optical properties of the liquid crystals: speed and contrast. The response time (either write-time or decay-time) of the liquid crystal electro-optic effect is inversely proportional to the square of the thickness of the liquid crystal layer. Conversely, contrast is a function of the birefringence of the liquid crystal and the thickness of the liquid crystal. The birefringence and efficiency of the liquid crystal material decrease with increasing wavelength. Thicker liquid crystals are, therefore, required at longer wavelengths to maintain the same level of contrast. Accordingly, the inherent problem with existing light valves used for infrared image conversion is that the thicker liquid crystal layer required for contrast purposes simultaneously results in a slower response time which is unsuitable for the fast real-time infrared conversion needed to test advanced infrared imagers.

Accordingly, it is the principal purpose of the present invention to provide a high performance, non-thermal dynamic visible to infrared image converter.

Another purpose of the present invention is to achieve both a high contrast and a fast response time in a light valve used as a visible to infrared imager converter.

Yet another purpose of the present invention is to utilize a low-power image source in an infrared simulation system.

SUMMARY OF THE INVENTION

The present invention, in a broad aspect, is a visible to infrared dynamic image converter light valve which utilizes two liquid crystal layers placed on opposite sides of a photoconductive substrate. The two liquid crystal layers spatially modulate an incident infrared beam by polarization rotation in response to s voltage applied across the two liquid crystal layers. The photoconductor substrate receives and absorbs an incident visible dynamic image which modulates the voltage applied across the two liquid crystal layers which varies the polarization rotation. A mirror is disposed adjacent to the second liquid crystal layer in order to reflect the infrared beam back through the two liquid crystal layers such that the beam passes through the crystal layers twice and its polarization is rotated twice in proportion to the visible image. A polarization device, located adjacent the first liquid crystal layer, converts the polarization rotation of the infrared beam to an output intensity modulation to produce a dynamic infrared image.

The foregoing arrangement of two liquid crystal layers spatially activated by a single photoconductor layer enables the employment of the equivalent 2L-thick liquid crystal layer having the response time of a single, 1L-thick liquid crystal layer. Accordingly, a factor of four is gained in the speed of response, which is crucial in realizing a high-speed device. The long depth of focus for infrared systems allows both liquid crystal layers to be in focus. Such an arrangement will enable the use of adequately thick liquid crystal layers for modulation and yet result in real-time operation in a simulation system.

The present invention also provides a unique method of converting a dynamic visible image to an infrared image in which an infrared beam is directed through two liquid crystal layers to effect spatial modulation of the beam by polarization rotation, with a voltage applied across the liquid crystal layers determining the amount of polarization rotation effected by the liquid crystal layers. A visible wavelength image or "write" beam is directed into the photoconductive layer between the two liquid crystal layers to spatially modulate the conductivity of the photoconductor, which results in spatial voltage modulation across both the liquid crystal layers. As discussed above, the spatially modulated infrared beam is passed through the liquid crystal layers twice and then demodulated.

In accordance with one feature of the invention, both the visible and infrared beams may be coupled into one side of the light valve. With this arrangement, an external dichroic mirror, transparent to infrared radiation and reflective of visible radiation, is used to direct the visible image into the first liquid crystal.

In an alternate embodiment, the dichroic mirror is not used and the mirror utilized to reflect the infrared beam is replaced by a dichroic mirror reflective of infrared radiation and transparent to visible radiation. In this configuration, the incident infrared beam and the visible wavelength radiation enter the light valve from opposite sides.

Other purposes, features, and advantages of the present invention will become apparent from the consideration of the following detailed description and the accompanying drawings.

DETAILED DESCRIPTION OF THE INVENTION

Figure 1:
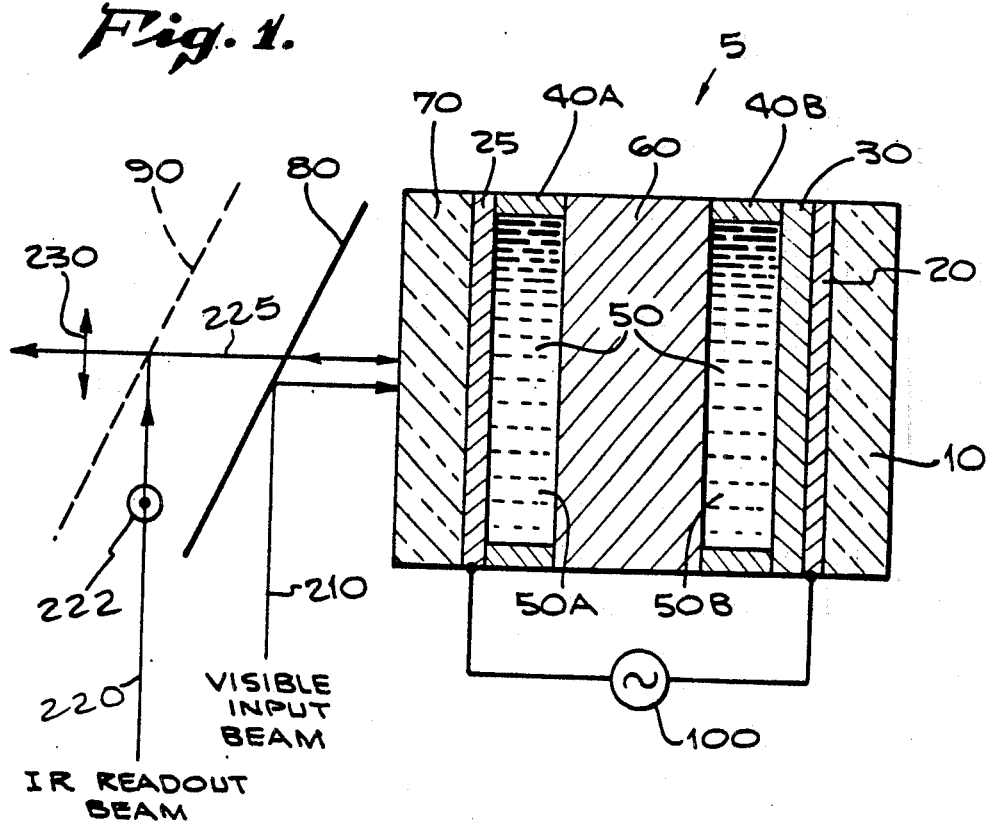
FIG. 1 shows a sectional view of a first embodiment of a visible to infrared dynamic image converter light valve according to the present invention.

Referring more particularly to the drawings, FIG. 1 shows a sectional view of a first embodiment of a dual liquid crystal cell-based visible to infrared dynamic image converter 5. Converter 5 converts a dynamic visible wavelength image or beam 210 to a dynamic infrared image or beam 230 through the modulation of an incident infrared readout beam 220. This is accomplished in the present invention by using a liquid crystal light valve configuration in which two liquid crystal cells, 50A and 50B, are disposed in series on opposite sides of a photoconductive substrate 60.

Liquid crystal cells 50A and 50B comprise liquid crystal medium known in the art such as described in U.S. Pat. No. 3,694,053 issued to F. J. Kahn or in "The Liquid Crystal Based Visible to IR Dynamic Image Converter (VIDIC)" by U. Efron et al., SPIE Proceedings, Paper 465-22, Jan. 22-27, 1984. The specific material chosen is dependent upon parameters known in the art such as the operating wavelength, mode of operation and required response or recovery time.

The liquid crystal medium of cells 50A and 50B is surrounded on its periphery by spacers 40A and 40B, respectively. The spacers chemically and electrically isolate the medium from surrounding apparatus and environment. In addition, the spacers help establish the desired thickness of the cell medium where the medium would be compressed by adjacent materials or simply flow away. Spacers 40 can comprise several materials known in the art including, but not limited to, $SiO_x$ on the order of 4 to 12 mm thick, where x is on the order of 2 to 4.

Cells 50A and 50B can be operated in the controlled birefringence mode as described in "Electric-Field-Induced Orientational Deformation of Nematic Liquid Crystals: Tunable Birefringence," by F. J. Kahn, *Applied Physics Letters*, Vol. 20, No. 5, Mar. 1, 1972, pages 199–201 or in the hybrid field effect mode as disclosed in U.S. Pat. Nos. 4,378,955 and 4,019,807 discussed above.

When cells 50A and 50B are operated in the hybrid field effect mode, as discussed in "A new Real-Time Non-Coherent to Coherent Light Image Converter" the hybrid field effect liquid crystal valve by J. Grinberg et al, *Optical Engineering*, Vol. 14, page 217 (1975), the twisted liquid crystal layers undergo angular tilt in response to an applied voltage. This angular displacement then translates to an angular rotation of the polarization of incident radiation.

In the preferred embodiment, each liquid crystal cell 50 has a twist angle of approximately 22.5 degrees so as to create an optimum total twist angle of 45 degrees. However, it is not necessary that cells 50A and 50B employ the same twist angle as long as the total angle of the two cells is 45 degrees. While 45 degrees is believed to be the optimum twist angle, it is known in the art that other angles on the order of 45 to 60 degrees may be sufficient to produce an adequately modulated output beam. Therefore, cells 50A and 50B can operate with other twist angles dependent upon the acceptance of the wire grid polarizer discussed below and the desired conversion efficiency.

When cells 50A and 50B are operated in the controlled birefringence mode, the polarization rotation is produced solely by the tilting action of the applied field. In this mode, more concern is placed on the thickness of the cells. It is the cell thickness in this mode that more directly determines the angle of polarization rotation that is imparted to incident radiation. Therefore, in this mode cells 50A and 50B need not have the same thickness but must have a total thickness as required to impart the 90 degrees rotation required.

Photoconductor 60, positioned between cells 50, comprises material known in the art and used in liquid crystal light valves. Photoconductor 60 is substantially transmissive of infrared wavelength radiation but highly absorbent of visible wavelength radiation. An examplary material would be a metal oxide semiconductor structure such as shown in U.S. Pat. No. 4,239,348, issued to J. Grinberg, et al. on Dec. 16, 1980 and/or U.S. Pat. No. 4,443,064, issued to J. Grinberg, et al. on Apr. 17, 1984. The description of the MOS photosubstrate in these patents is incorporated herein by reference.

Alternatively, a Schottky barrier structure could be used.

The liquid crystal cells 50A, 50B and photosubstrate 60 combination are positioned between a faceplate 70 and electrode 25 on one side and a mirror 30, electrode 20 and faceplate 10 on the other side.

Faceplate 70 provides an optical interface for the liquid crystal cells as well as mechanical support and isolation. Faceplate 70 can comprise several materials known in the art including, but not limited to, a 6 to 10 mm potassium chloride (KCl) substrate or an optical quality glass substrate. In addition, faceplate 70 can be a fiber optic faceplate which is composed of an array of optical fiber waveguide segments that are highly transmissive of radiation at both visible and infrared wavelengths.

Electrode 25 is an electrode that provides a low resistivity voltage path for one surface of liquid crystal cell 50A while being optically transparent to both visible and infrared wavelength radiation. This can be achieved by using a very thin film of indium-tin-oxide (ITO) on the order of 0.02 $\mu$m or less thick which is substantially transparent to both visible and infrared radiation. The ITO film of electrode 25 can be deposited onto the face of faceplate 70. It is readily understood by those skilled in the art that other metals or materials can be used provided they are thin enough and have a low enough free electron carrier density to allow the infrared radiation to pass through without absorption.

Mirror 30, which is adjacent to liquid crystal cell 50B, is a mirror that is highly reflective of infrared wavelength radiation. Mirror 30 comprises material known in the art for infrared reflection such as a dielectric mirror composed of alternating layers of differing index of refraction material or a single metallic layer deposited on a glass substrate. Such mirrors are readily understood by one skilled in the art of light valve manufacture.

In order to apply a voltage across liquid crystal cells 50A, 50B and photoconductor 60, an electrode 20 is provided adjacent to mirror 30 and an AC power source 100 is operatively connected between electrodes 25 and 20. In the embodiment of FIG. 1, electrode 20 does not need to allow infrared or visible radiation to pass through and can be made from a film or material thicker than electrode 25. Examplary electrodes are: an ITO film 30 $\mu$m or greater in thickness and aluminum or gold on the order of 0.3 to 0.5 $\mu$m thick. At the same time, it is readily appreciated by one skilled in the art that for the embodiment of FIG. 1, electrode 20 and mirror 30 can also be combined into a single element as where a conductive coating is deposited on an infrared reflective substrate.

Also, electrode 20 can be deposited on faceplate 10 which is a faceplate provided to complete the liquid crystal light valve assembly of converter 5 and provide mechanical integrity and electrical insulation of electrode 20 from the surrounding environment. Faceplate 10 can be any suitable substrate such as a glass, fiber glass or silicon substrate which provides insulation or is easily coated with the materials comprising electrode 20 and/or mirror 30.

Voltage source 100 is a conventional alternating current (AC) source of the type discussed in the basic light valve patents cited herein. Preferably, the AC voltage source provides an asymmetric period voltage waveform such that photoconductor 60 alternates between a long (active) depletion phase and a short (refreshing) accumulation phase. The voltage from voltage source 100 is connected to electrodes 25 and 20 through conventional conductors and electrode contacts.

The structure described above for one preferred embodiment of the present invention is clearly not all inclusive of the possible substrates and material layers that can be employed in the manufacture of a liquid crystal light valve. It is also to be understood that additional insulating layers of material such as silicon dioxide can be used adjacent to liquid crystal cells 50 where increased isolation of the liquid crystals is desired. Additional faceplate structures or substrates can be used where additional mechanical strength is required.

Returning now to FIG. 1, both a visible wavelength input image beam 210 and an infrared (IR) wavelength input or readout image beam 220 enter converter 5 through faceplate 70.

Visible input beam 210 is provided by an optical image source, not shown for clarity, such as a CRT display, video camera system or other image projectors. Beam 210 need not be a high power or very high intensity beam as in previous thermally-based imaging system 8. Beam 210 only needs sufficient power to activate photosubstrate 60 which is considerably less than thermalizing a film. The beam is directed to converter 5 by conventional optical elements, also not shown, where it is further directed onto faceplate 70 by a dichroic mirror 80. Dichroic mirror 80 is substantially reflective of visible wavelength radiation but transmissive of infrared wavelength radiation allowing the passage of infrared input and output beams through the mirror. Mirror 80 comprises substrates and optical coatings commonly used in the art for this purpose.

Infrared input beam 220 is provided by a reasonably high quality infrared source, not shown, such as is known in the art. The beam is directed onto faceplate 70 through the use of an infrared wavelength wire grid beam splitter polarizer 90.

Wire grid polarizer 90 reflects radiation with an intensity dependent upon its angle of polarization with respect to the grid members. The maximum reflectivity for radiation incident on polarizer 90 is for radiation polarized parallel to the grid members. Therefore, infrared radiation incident on wire grid 90 will be transmitted through the grid if it is polarized perpendicular to the grid pattern and reflected into faceplate 70 to form an infrared beam 225 if it is polarized parallel to the grid members. In the preferred embodiment of the present invention, the infrared 220 beam source is arranged so as to produce an infrared beam that is substantially 100 percent polarized parallel to the grid members for maximum transfer efficiency. This is illustrated in FIG. 1 by the indication at point 222 that beam 220 is polarized perpendicular to the plane of the figure.

The resultant infrared beam 225 and visible image beam 210 both pass through faceplate 70 then through electrode 25 and liquid crystal cell 50A before encountering photoconductor 60. Infrared beam 225 passes through photoconductor 60 and cell 50B, to mirror 30 where it is reflected back through cells 50B and 50A, photoconductor 60 and faceplate 70. As previously discussed, photoconductor 60 is transparent to the infrared beam.

. As infrared beam 225 traverses liquid crystal cells 50A and 50B, it is spatially modulated by polarization rotation. Since infrared beam 225 is reflected back through the cells, each pass of a liquid crystal cell induces about 25 percent of the total polarization rotation experienced by infrared beam 225 (for identical cells).

However, as previously discussed, there is no requirement that each liquid crystal cell actually modulate the beam by the same percentage or degree.

At the same time, the dynamic input image in the form of visible input beam 210 is absorbed in photoconductor 60 and effects a spatial modulation of the impedance of the photoconductor.

With a voltage applied across the liquid crystal cells 50A, 50B and photoconductor 60 combination, a variation in photoconductor impedance creates a variation in voltage drop across the liquid crystal medium of cells 50A and 50B, which in turn varies the crystal orientation and the polarization rotation induced in infrared radiation traversing the liquid crystal cells. Therefore, spatial intensity variations in visible input beam 210, which is absorbed by photoconductor 60, effect spatial modulation in the polarization of infrared radiation traversing liquid crystal cells 50A and 50B.

Returning now to reflected infrared beam 225, after passing back through liquid crystal cells 50A and 50B, it will impinge on wire grid polarizer 90 where polarization rotation is converted into intensity modulation. This occurs because in order for radiation to be reflected initially into faceplate 70 to form infrared beam 225 it had to be polarized substantially parallel to the wire grid. However, the radiation in infrared beam 225 has now been polarization-rotated spatially by various degrees (dependent upon spatial position in cells 50) due to passage through liquid crystal cells 50A and 50B. Therefore, some radiation passes through grid 90, while some is reflected dependent upon the degree of polarization rotation induced in beam 225, which in turn is dependent upon the spatial intensity of visible input beam 210. Therefore, an infrared image is transmitted as a resulting infrared beam 230 in response to the visible image of beam 210.

One sequence of steps used in the manufacture of the present invention is basically as follows. The liquid crystal light valve can be considered as having two halves, a reflection portion and a readout portion. The reflection portion consists of a glass substrate 10, electrode 20, mirror 30, liquid crystal cell 50B, spacer 40B and the photoconductive substrate 60. To manufacture the reflection portion, a conductive electrode film 20 is evaporated onto glass faceplate or substrate 10, followed by the deposition of the metallic mirror 30, the liquid crystal spacer 40B and finally a liquid crystal layer to form cell 50B. The photoconductive substrate 60 is then mounted on liquid crystal cell 50B.

The readout section of the device is manufactured starting with faceplate or substrate 70, onto which a conductive film for electrode 25 is evaporated, followed by evaporation of liquid crystal spacer 40A and the deposition of a liquid crystal layer to complete cell 50A. The two portions of the device are then assembled together.

A critical aspect of the configuration is the possible loss of resolution or "defocussing" as the object point of the input image is spread along the two liquid crystal cells separated by a thick (on the order of 75-155 $\mu$m) silicon photoconductor. The depth of focus, $\delta X$, for an optical system is given by the equation $\delta X = 2F/N_{res}$, where $N_{res}$ is the number of resolution elements and F is the focal length. For an infrared beam, this depth of focus is quite large. For F=300 mm and $N_{res}$=1000 elements, $\delta X$ is approximately equal to 600 $\mu$m, which is substantially longer than the longitudinal spread of the visible input image written on the liquid crystal layers in cells 50A and 50B. Thus, for long wavelength modulation, the increased depth of focus allows the dual cell configuration to compensate for that loss. One advantage of the present configuration is that, to a first approximation, the output uniformity of the readout beam is independent of the thickness uniformity of a polished silicon wafer used for faceplate 10.

Figure 2:
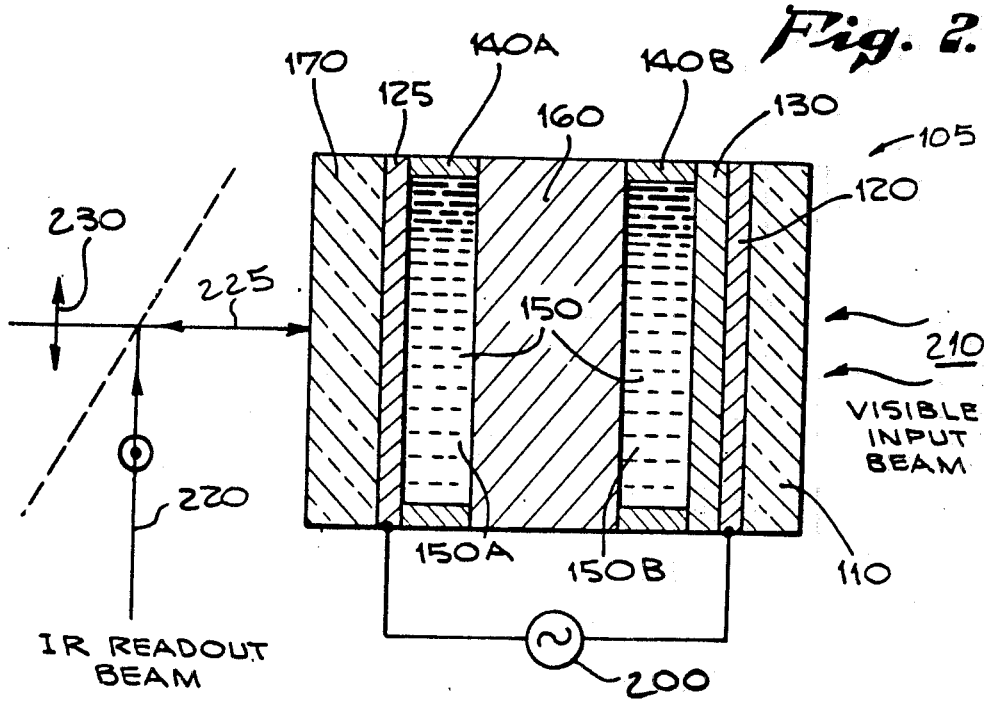
FIG. 2 shows a sectional view of an alternative embodiment of a visible to infrared dynamic image converter light valve according to the present invention.

FIG. 2 shows an alternate embodiment of the present invention which operates in basically the same manner as the prior embodiment. The difference lies in the fact that the visible wavelength image 210 and the infrared readout beam 220 enter image converter 105 from opposite sides. The resulting infrared image beam 230 is the same as before. Likewise, the manner in which the converter operates in terms of spatially modulating infrared beam 220 by polarization rotation is the same as in the first embodiment.

In converter 105, the electrode layer 120 is now required to be substantially transparent to visible wavelength radiation. An examplary material would be an ITO film on the order of 0.02 $\mu$m thick. Such a film can be deposited on a glass substrate such as faceplate 110. Therefore, for this alternate embodiment, the steps of manufacture for the visible wavelength input portion would be as follows.

A thin conductive electrode 20 is evaporated onto faceplate 110 which can be a glass substrate or fiber optic faceplate as in the previous case for faceplate 70. However, faceplate 110 only requires transmission of visible wavelength radiation. Next, a dichroic mirror 130 is deposited on electrode 120. Mirror 130 must be highly reflective of infrared radiation but transparent to visible wavelength radiation.

The dichroic mirror 130 can also be made of ITO as suggested in U.S. Pat. No. 4,114,911, so that the electrode and dichroic mirror functions can be combined in one layer.

The remainder of the liquid crystal light valve is the same as that shown in FIG. 1 and as described hereinabove. The reference numerals of corresponding parts for FIG. 2 and FIG. 1 are the same except that they have been increased by 100 in FIG. 2. Accordingly, 110 in FIG. 2 corresponds to 10 in FIG. 1; 150A in FIG. 2 corresponds to 50A in FIG. 1. The only exception to the equivalency of parts in FIGS. 1 and 2 is that visible transparency is no longer required for the infrared transparent faceplate or substrate 170. Accordingly, this substrate can be made of material such as potassium chloride or an AR-coated germanium slab 5-10 mm thick.

The difference in operation of this configuration, as mentioned before, from that shown in FIG. 1, is that the visible write beam is input from the right-hand side of the device, thus separating the input and output beams.

In the foregoing description of the present invention, a preferred and alternate embodiment of the invention has been discussed. It is, therefore, to be understood that other design variations are within the scope of the present invention. Accordingly, the invention is not limited to the particular arrangement that has been illustrated and described in detail herein.

What is claimed is:

1. A visible to infrared dynamic image converter light valve comprising:
    first and second liquid crystal means for spatially modulating an incident infrared beam by polarization rotation;

means for applying a voltage across said first and second liquid crystal means, said polarization rotation in said first and second light crystal means being responsive to said applied voltage;

photoconductor means, disposed between said first and second liquid crystal means, for receiving a visible wavelength image and for spatially modulating said voltage applied across said first and second liquid crystal means responsively to said image to vary said polarization rotation, said photoconductor means being absorptive of visible wavelength radiation and transparent to infrared radiation;

mirror means, disposed adjacent said second liquid crystal means, for reflecting said infrared beam back through said first and second liquid crystal means, whereby said infrared beam passes through said first and second liquid crystal means twice and is polarization rotated in proportion to said visual wavelength image; and polarization means, disposed adjacent said first liquid crystal means, for converting said polarization rotation of said infrared beam to output intensity modulation to produce an infrared image.

2. The light valve of claim 1, wherein said first and second liquid crystal means are operated in the hybrid field effect mode.

3. The light valve of claim 2, wherein said first and second liquid crystal means have a total twist angle of approximately 45–60 degrees.

4. The light valve of claim 1 wherein said first and second liquid crystal means are operated in the controlled birefringence mode and have the thickness required to a minimum predetermined provide polarization rotation to said incident infrared beam.

5. The light valve of claim 1, wherein said mirror means comprises a metallic mirror reflective of infrared radiation.

6. The light valve of claim 1, wherein said photoconductor means comprises a metal oxide semiconductor substrate.

7. The light valve of claim 1, wherein said photoconductor means comprises a Schottky barrier substrate.

8. A light valve as defined in claim 1, wherein said means for applying a voltage across said first and second liquid crystal means comprises:
   an alternating current voltage source;
   first conductive film means, connected to said voltage source and disposed on the side of said first liquid crystal means away from said photoconductor means for coupling said voltage to said first liquid crystal means; and
   second conductive film means, connected to said voltage source and disposed between said second liquid crystal means and said mirror means, for coupling said voltgage to said second liquid crystal means.

9. The light valve of claim 8, wherein said first and second conductive films are each comprised of an indium-tin-oxide film.

10. The light valve of claim 1, wherein said light valve further comprises:
   faceplate means, disposed exteriorly of said first liquid crystal means, for receiving said incident visible wavelength image and said incident infrared beam, whereby said visible wavelength image and said infrared beam enter said valve from the same side.

11. The light valve of claim 10, wherein said faceplate means comprises potassium chloride.

12. The light valve of claim 10, wherein said faceplate means comprises a fiber optic faceplate that is substantially transparent to visible and infrared wavelength radiation.

13. The light valve of claim 1, wherein said polarization means comprises a wire grid polarizer, disposed on the side of said first liquid crystal means, facing away from said photosubstrate for reflecting said incident infrared beam from its source into said first liquid crystal means and for transmitting the polarization-rotated component of an output infrared beam which is reflected from said mirror means.

14. The light valve of claim 13, wherein said light valve further comprises:
   dichroic mirror means, highly reflective to visible wavelength radiation and substantially transparent to infrared wavelength radiation and disposed exteriorly of said first liquid crystal means, for directing said visible wavelength image from its source into said first liquid crystal means, whereby said infrared beam and said visible wavelength image are both incident upon said first liquid crystal means.

15. The light valve of claim 14, wherein said dichroic mirror means comprises:
   a silicon substrate; and
   a metallic film, reflective of infrared radiation, deposited upon said substrate.

16. The light valve of claim 14, wherein said dichroic mirror means comprises:
   a germanium substrate; and
   a metallic film, reflective of infrared radiation, deposited upon said substrate.

17. The light valve of claim 1, wherein said light valve further comprises spacer means, disposed about the peripheries of said first and second liquid crystal means, for insulating said peripheries.

18. The light valve of claim 14, wherein said spacer means comprises silicon dioxide.

19. The light valve of claim 1, wherein said light valve further comprises:
   first faceplate means, disposed adjacent said first liquid crystal means, for receiving said incident infrared beam;
   second faceplate means, disposed adjacent said second liquid crystal means, for receiving said incident visible wavelength image, whereby said visible wavelength image and said infrared beam enter said valve from opposite sides.

20. The light valve of claim 19, wherein:
   said first faceplate means comprises potassium chloride; and
   said second faceplate means comprises a fiber optic faceplate.

21. The light valve of claim 19, wherein said mirror means comprises dichroic mirror means, reflective of infrared radiation and transparent to visible wavelength radiation, for passing said visible wavelength radiation to said photoconductor means and for reflecting said infrared beam back through said first and second liquid crystal means.

22. A method for converting a dynamic visible image to an infrared image utilizing an infrared beam, comprising:
   directing said infrared beam through two liquid crystal layers disposed in spaced-apart relationship to effect spatial modulation of said beam by polarization rotation to produce a modulated infrared beam;

applying a voltage across said first and second liquid crystal layers to control the amount of polarization rotation effected by said liquid crystal layers;

directing said visible image into a photoconductive layer disposed between said liquid crystal layers to spatially modulate said voltage applied across said liquid crystal layers responsively to said image to vary said polarization rotation;

reflecting said modulated infrared beam back through said liquid crystal layers to effect passage of said modulated infrared beam through said layers twice; and converting said polarization rotation of said modulated infrared beam with a dynamic visible wavelength image to produce a dynamic infrared image, comprising:

two liquid crystal means, disposed in parallel space-apart relationship to receive said infrared beam, for spatially modulating said infrared beam by polarization rotation, said modulation being voltage-responsive;

means for applying a voltage across said two liquid crystal means;

photoconductor means, disposed between said two liquid crystal means, for receiving and absorbing said visible wavelength image, and for modulating said applied voltage spatially responsively to said visible wavelength image to vary the polarization rotation of said infrared beam by said liquid crystal means;

mirror means for reflecting said modulated infrared beam back through said two liquid crystal means thereby causing said infrared beam to pass twice through said liquid crystal means; and polarization conversion means for converting said polarization rotation of said infrared beam to output intensity to produce said dynamic infrared image.

* * * * *